A. SVEJNAR.
VAGINAL APPLIANCE.
APPLICATION FILED MAY 8, 1911.
1,003,821.
Patented Sept. 19, 1911.
2 SHEETS—SHEET 1.
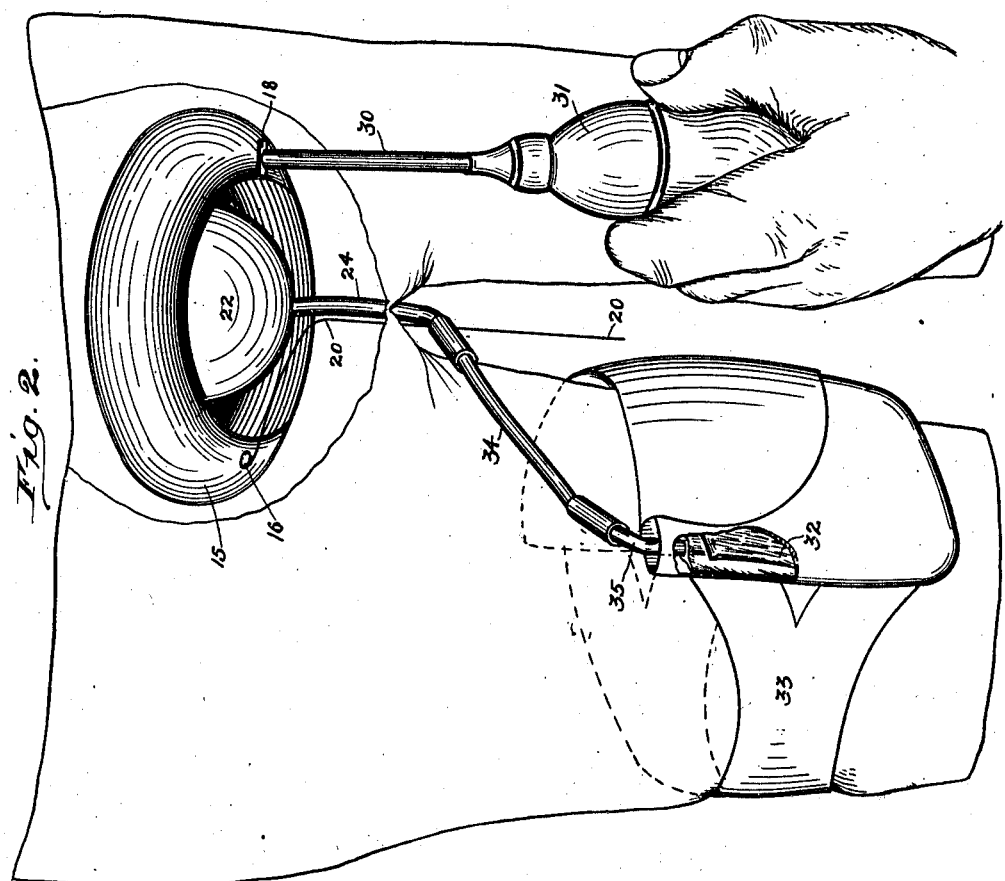
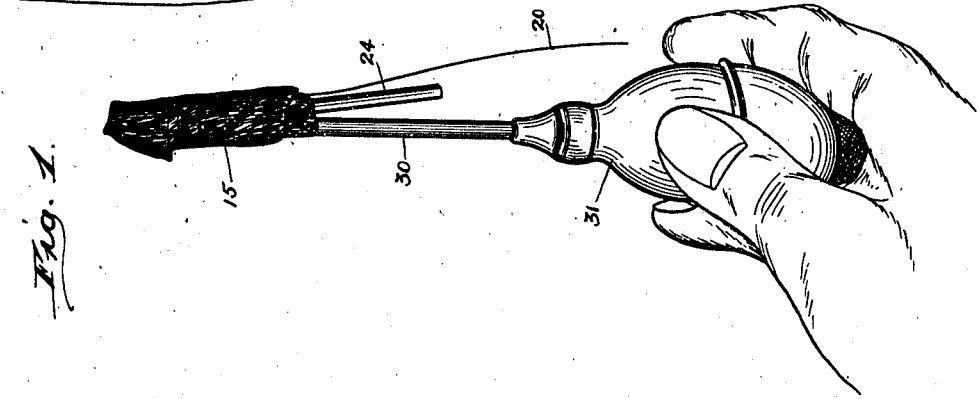
Witnesses:
Chas. E. Gorton
E. Newstrom
Inventor:
Anton Svejnar:
By Chas. C. Tillman
Atty.

A. SVEJNAR.
VAGINAL APPLIANCE.
APPLICATION FILED MAY 8, 1911.
1,003,821.
Patented Sept. 19, 1911.
2 SHEETS—SHEET 2.
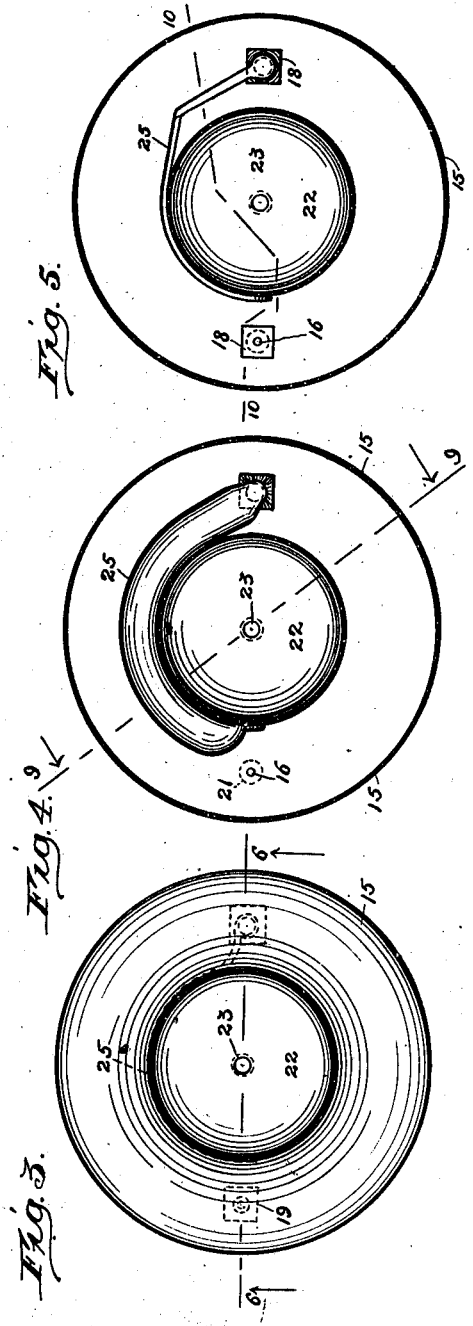
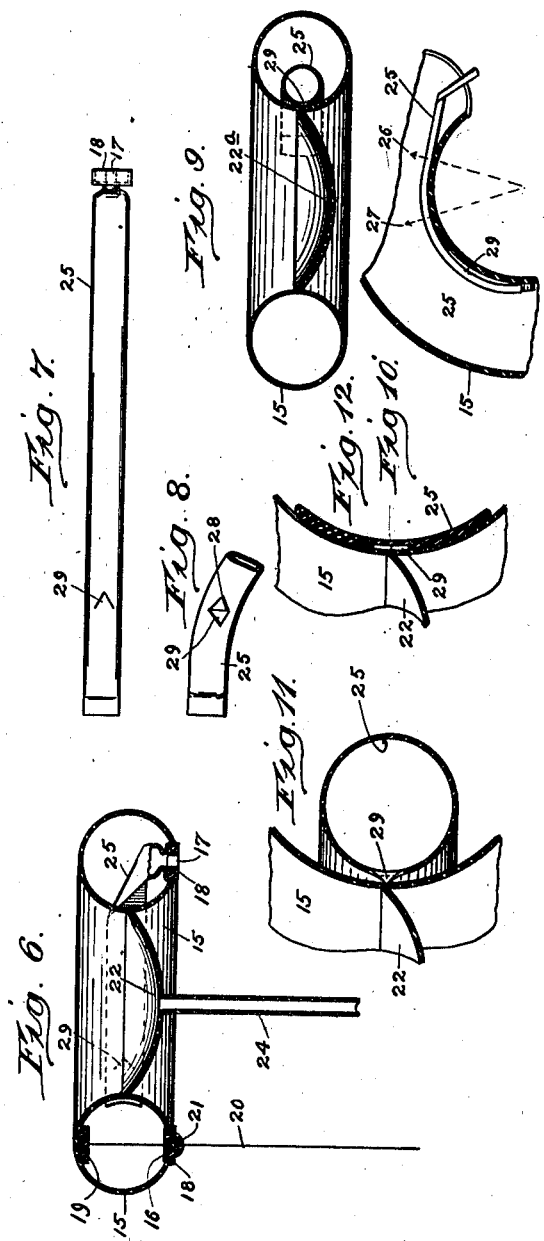
Witnesses
Chas. E. Gorton
E. Newstrom
Inventor:
Anton Svejnar
By Chas. C. Tillman
Atty

UNITED STATES PATENT OFFICE.

ANTON SVEJNAR, OF CHICAGO, ILLINOIS.

VAGINAL APPLIANCE.

1,003,821.

Specification of Letters Patent. Patented Sept. 19, 1911.

Application filed May 8, 1911. Serial No. 625,714.

*To all whom it may concern:*

Be it known that I, ANTON SVEJNAR, a subject of the Emperor of Austria-Hungary, residing at Chicago, in the county of Cook and State of Illinois, have invented certain new and useful Improvements in Vaginal Appliances, of which the following is a specification.

This invention relates to certain new and useful improvements in an appliance to be used for therapeutical purposes in the treatment of diseases of the generative organs of females, such as prolapsus-uteri, hemorrhage, and leucorrhea, as well as a catamenial appliance, and it consists in certain peculiarities of the construction, novel arrangement and operation of the various parts thereof as will be hereinafter more fully set forth and specifically claimed.

The principal object of the invention is to provide an appliance of the above named general character which shall be simple and inexpensive in construction, durable, and efficient in operation and so made that it may be easily inserted into the vagina and distended to the operative position of its parts when desired for use, yet can be readily collapsed and removed therefrom.

Other objects and advantages of the invention will be disclosed in the subjoined description and explanation.

In order to enable others skilled in the art to which the invention pertains to make and use the same I will now proceed to describe it referring to the accompanying drawings in which—

Figure 1, is a perspective view of a vaginal appliance embodying the invention showing it in its collapsed form and supported on a nozzle of a pneumatic syringe or air bulb ready for insertion into the vagina. Fig. 2, is a greatly enlarged perspective of the appliance showing the relative positions of the parts thereof and the device used for inflating the same and illustrating the appliance within the vagina, and provided with a catamenial sack, to which it is communicatively connected. Fig. 3, is a top plan view of the device showing it inflated. Fig. 4, is a horizontal sectional view thereof, showing the inner inflating tube distended. Fig. 5, is a similar view but showing the inner tube deflated. Fig. 6, is a diametrical sectional view taken on line 6—6, of Fig. 3, looking in the direction indicated by the arrows. Fig. 7, is a detached view in side elevation of the inner surface of the inner or inflating tube. Fig. 8, is a fragmental view thereof showing the outlet valve of the same open. Fig. 9, is a sectional view taken on line 9—9, of Fig. 4, looking in the direction indicated by the arrows. Fig. 10, is a plan sectional view taken on line 10—10, of Fig. 5, showing a portion of the outer tube or ring and the inflating tube therefor, illustrating the manner in which they are connected together. Fig. 11, is an enlarged perspective view partly in section of a portion of the ring or outer tube and the inflating tube therefor, showing the latter distended and the valve of the same open, and Fig. 12, is a similar view of like parts showing the inflating tube collapsed and the valve therefor closed.

Like numerals of reference refer to corresponding parts throughout the different views of the drawings.

The reference numeral 15, designates a tubular ring which is preferably made of thin sheet rubber so as to be collapsible and quite soft and flexible. This tubular ring has in its lower portion, and preferably located diametrically opposite each other a pair of openings 16 and 17, each of which may be reinforced by means of apertured portions 18, applied to the material out of which the ring 15, is made. Directly above the opening 16, the ring 15, is provided on its inner surface with a reinforcing portion 19, to which is secured one end of a string 20, which is extended through the opening 16, and has fixed thereon near said opening but outwardly therefrom, a stopper or valve 21, for said opening. Connected at its periphery to the inner periphery of the ring 15, is a flexible support or apron 22, which has a central opening 23, from which leads a discharge tube 24, which is preferably made of soft flexible material. Connected at one of its ends to the inner surface of the ring 15, and communicating with the opening 17, therein, is an inner or inflating tube 25, which is made of flexible material such as sheet rubber and has its other end secured to the inner surface of the inner periphery of the ring 15, near the opening 16, in said ring as is clearly shown in Figs. 4 and 10, of the drawings. By reference to the last named figure, it will be seen and understood that that surface of the inflating tube 25, adjacent to the inner surface of the inner periphery of the tube 15, is secured by means of an adhesive to the inner surface of the inner periphery of the ring 15, at a point extending from the dotted line 26, to about the dotted line 27, in said figure from which latter dotted line the tube 25, is free from the inner periphery of the ring 15, up to the fixed end thereof near the opening 16, in the ring. The surface of the tube 25, adjacent to the inner periphery of the ring 15, is provided in this free portion with an opening 28, to one edge of which is movably connected a leaf valve 29, which is interposed between the tube 25, and the inner periphery of the ring 15. By this arrangement it will be understood that when the ring 15, and the tube 25, are in their collapsed conditions the tube or stem 30, of a pneumatic syringe or air bulb 31, may be inserted into the opening 17, of the ring 15, when the collapsed ring 15, and inflating tube 25, may be wrapped around the upper portion of the stem 30, as is clearly shown in Fig. 1, of the drawings, when the appliance may be easily inserted into the vagina after which by forcing air by means of the air bulb 31, through the tube 30, and opening 17, in the outer ring, it is apparent that the air will pass into the inflating tube 25, and escape therefrom through the opening 28, therein, until the ring 15, is fully inflated when it will occupy a horizontal position in the vagina below the uterus. In this operation the inflating tube 25, will also be inflated, thus causing the valve 29, to close the opening 28, by reason of the pressure against said valve of the inner periphery of the ring.

The opening 16, in the ring 15, may be closed by means of the stopper or valve 21, before the operation of inflating the ring is begun thus preventing air escaping through the opening 16, in the ring. After the ring is fully inflated it is apparent that the stopper or valve 21, will be held in its seated position by reason of the compressed air within the ring, but when it is desired to collapse the parts the string 20, which may be extended downwardly and outwardly between the labia of the vagina, may be drawn downwardly which will remove the valve 21, from the opening 16, thus allowing the air to escape and permitting the ring and inflating tube 25, to be collapsed, and to be easily removed from the vagina. As the apron or support 22, closes the opening formed by the inner periphery of the ring 15, it is evident that it will afford a support for the uterus, and as it is cup-shaped and flexible that it will guide any discharges to the opening 23, therein from whence it may be conducted to the pipe 24, to a sack 32, or other receptacle, which is preferably made of flexible material and may be secured to one of the legs by means of an elastic band 33, or otherwise. Connecting the sack 32, to the tube 24, are coupling tubes 34 and 35, which are preferably made of flexible material.

In Fig. 9, of the drawings, is shown a modification in the construction of the appliance, which consists in employing the collapsible ring 15, and inflating tube 35, of the same construction as above set forth but in using an imperforate apron or support 22ª, instead of one having the opening 23, and a tube leading therefrom as in the above described construction. This modified form of the appliance is particularly adapted for use as a pessary and may be inserted into the vagina and inflated and removed therefrom in a similar manner to that of the other construction and above described.

Having thus fully described my invention, what I claim as new and desire to secure by Letters Patent is—

1. In a vaginal appliance, the combination with a collapsible ring having an inlet and an outlet opening for air, of an inflating tube secured at one of its ends to the inner surface of said ring around the inlet opening thereof and at its other end to the inner surface of the inner periphery of the ring, a valved opening in the inflating tube intermediate of its ends and on its surface adjacent to the inner periphery of the ring, a string extended through the outlet opening of the ring and secured at one of its ends to the inner surface of said ring, a valve on the string outwardly of the outlet opening to open and close the latter, and a flexible support secured at its edges to the inner periphery of the ring.

2. In a vaginal appliance, the combination with a collapsible ring having an inlet and an outlet opening for air, of an inflating tube secured at one of its ends to the inner surface of said ring around the inlet opening thereof and at its other end to the inner surface of the inner periphery of the ring, a valved opening in the inflating tube between its ends and on its surface adjacent to the inner periphery of the ring, a string extended through the outlet opening of the ring and secured at one of its ends to the inner surface of said ring, a valve on the string outwardly of the outlet opening to open and close the latter, and a flexible support secured at its edges to the inner periphery of the ring and provided with an outlet.

3. In a vaginal appliance, the combination with a collapsible ring having an inlet and an outlet opening for air, of an inflating tube secured at one of its ends to the inner surface of said ring and communicating with the inlet opening thereof and at its other end to the inner surface of the inner periphery of the ring, a valved opening in the inflating tube between its ends and on its surface adjacent to the inner periphery of the ring, a string extended through the outlet opening of the ring and secured at one of its ends to the inner surface of said ring, a valve on the string outwardly of the outlet opening to open and close the latter, a flexible support secured at its edges to the inner periphery of the ring and provided with an outlet opening, a tube connected at one of its ends to said opening in the support, and a receptacle having communication with the other end of said tube.

ANTON SVEJNAR.

Witnesses:
S. J. HALIK,
CHAS. C. TILLMAN.